United States Patent
Andonian et al.

(10) Patent No.: US 7,059,447 B1
(45) Date of Patent: Jun. 13, 2006

(54) AUTOMOTIVE VEHICLE STEERING SYSTEM HAVING AN ELECTRIC MOTOR POWERED LINEAR ACTUATOR SHAFT FOR TURNING A STEERED WHEEL

(75) Inventors: Brian James Andonian, Livonia; Michael Kenneth Liubakka, Canton; Gregory James Stout, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/468,154

(22) Filed: Dec. 21, 1999

(51) Int. Cl.
  *B62D 5/04* (2006.01)

(52) U.S. Cl. ....................... 180/444; 180/443
(58) Field of Classification Search ............ 74/424.8 C, 74/388 PS; 180/444, 443, 446, 402, 408, 180/412, 413; 310/80; 475/331, 343, 344
See application file for complete search history.

(56) References Cited

U.S. PATENT DOCUMENTS

| | | | |
|---|---|---|---|
| 2,683,379 A | 7/1954 | Strandgren | |
| 3,633,701 A | 1/1972 | LeTourneau | 180/79.1 |
| 3,823,899 A | 7/1974 | Currey | 244/103 W |
| 4,225,148 A * | 9/1980 | Andersson | 280/95 R |
| 4,526,053 A * | 7/1985 | Carson | 74/424.8 C |
| 4,615,229 A * | 10/1986 | Granbom | 74/424.8 C |
| 4,648,285 A * | 3/1987 | Carson | 74/424.8 C |
| 4,694,925 A | 9/1987 | Roberts | 180/79.1 |
| 4,773,497 A * | 9/1988 | Carlson et al. | 180/444 |
| 4,841,790 A * | 6/1989 | Williston et al. | 74/89.15 |
| 4,987,788 A | 1/1991 | Bausch | 74/89.15 |
| 5,033,566 A | 7/1991 | Moretti et al. | 180/79.1 |
| 5,083,626 A | 1/1992 | Abe et al. | 180/79.1 |
| 5,086,861 A | 2/1992 | Peterson | 180/79.1 |
| 5,135,067 A | 8/1992 | Kohata et al. | 180/79.1 |
| 5,247,441 A | 9/1993 | Serizawa et al. | 364/424.05 |
| 5,251,135 A | 10/1993 | Serizawa et al. | 364/424.05 |
| 5,299,649 A * | 4/1994 | Sano et al. | 180/444 |
| 5,327,986 A | 7/1994 | Saita | 180/79.1 |
| 5,491,372 A | 2/1996 | Erhart | |
| 5,557,154 A | 9/1996 | Erhart | 310/80 |
| 5,573,079 A | 11/1996 | Suda et al. | 180/444 |
| 5,595,089 A | 1/1997 | Watanabe et al. | 74/89.15 |
| 5,836,208 A * | 11/1998 | Dietrich et al. | 74/424.8 C |
| 5,921,344 A * | 7/1999 | Boyer | 180/444 |
| 5,988,311 A * | 11/1999 | Kuribayashi et al. | 180/444 |
| 5,992,258 A * | 11/1999 | Kawase | 74/424.8 C |
| 6,098,479 A * | 8/2000 | Hoermansdoerfer | 74/424.8 C |

FOREIGN PATENT DOCUMENTS

| | | |
|---|---|---|
| DE | 3827039 A | 2/1990 |
| EP | 0512591 A1 | 11/1992 |
| WO | WO0071404 A1 | 11/2000 |

* cited by examiner

*Primary Examiner*—Brian L. Johnson
*Assistant Examiner*—Daniel Yeagley
(74) *Attorney, Agent, or Firm*—Gregory P. Brown

(57) ABSTRACT

An automotive vehicle steering system has an actuator (12) for steering a wheel (10). A shaft (28) passes axially through the interior of a housing (14) of the actuator and through a rotor tube (56) journaled for rotation within the housing. On the exterior of the housing one end of the shaft is coupled to the wheel. An electric motor (52) within the interior of the housing rotates the rotor tube when the wheel is steered by a steering wheel. An internal screw thread (68) on the rotor tube and an external screw thread (70) on the shaft are operatively coupled by a set (74) of transmission rollers (76) to provide for bi-directional transmission of motion between the rotor tube and the shaft such that rotation of the rotor tube causes the shaft to move axially of the housing to steer the vehicle wheel and axial motion of the shaft due to wheel recovery from a turn rotates the rotor tube.

6 Claims, 3 Drawing Sheets

AUTOMOTIVE VEHICLE STEERING SYSTEM HAVING AN ELECTRIC MOTOR POWERED LINEAR ACTUATOR SHAFT FOR TURNING A STEERED WHEEL

BACKGROUND OF THE INVENTION

1. Field of the Invention

This invention relates generally to automotive vehicle steering systems, and more particularly to a steering system that includes an electric actuator having a shaft that translates linearly to turn a vehicle wheel.

2. Background Information

A preliminary novelty search in connection within this invention developed various U.S. Patents that are identified on an attachment to an accompanying Information Disclosure Statement. Also identified on that attachment are two U.S. Patents relating to electric motor powered linear actuators.

The state of the art shows that it is known to utilize an electric powered actuator in an automotive vehicle steering system to aid in turning steered wheels on opposite sides of a vehicle, such as right and left front wheels of a four wheeled vehicle. The steered wheels are turned by a steering wheel that is coupled through a steering column shaft to a pinion of a mechanical steering gear that imparts linear motion to a steering rack that is coupled to the steered wheels. As the steering wheel is turned, a shaft of the electric powered actuator translates linearly to aid the motion of the rack by supplying a major share of the force that turns the wheels. This type of system is referred to by various names such as electrically assisted steering or electric power steering.

The state of the art also reveals another type of steering system, one in which a steering wheel is not mechanically coupled to the steered wheels, but rather is electrically coupled by wires to an electric actuator for turning a single wheel or a pair of wheels, such as right and left wheels. Such a steering system lacks a steering column shaft that is coupled to the wheels through a mechanical steering gear that operates a rack. This type of system is sometimes referred to as a steer-by-wire system. In a four wheel vehicle, front wheels alone may be steered, or all four wheels may be steered.

A steered wheel of a vehicle imposes certain requirements on linear force that a shaft of an electric actuator must exert in order to turn the wheel. The mechanism of one type of electric actuator that is suitable for use in a steering system of one of the types described above converts electric energy into rotational motion and the rotational motion into linear motion for translating the actuator shaft. The force that is imposed on the actuator shaft by the wheel or wheels that the actuator turns is therefore reflected as torque load imposed on a rotary portion of the actuator.

SUMMARY OF THE INVENTION

The present invention relates to vehicle steering systems comprising electric actuators having a construction that is believed to endow the system with improved torque transmission and/or torque-to-force conversion characteristics, especially in regard to bi-directional motion characteristics. Such improvements may provide expanded use of such systems over a wider range of vehicles, especially a wider range of vehicle sizes. More widespread use of such an improved system may yield favorable cost benefits to a manufacturer who mass produces automotive vehicle steering systems.

Providing each steered wheel with its own devoted actuator may afford certain advantages in the design of a vehicle because there is greater freedom in selecting a location for mounting each actuator. For example, any given actuator may be situated in an orientation in a vehicle that is either the same as, or different from, the orientations of other actuators. Examples of various general orientations, as viewed in plan, are longitudinal (fore and aft), lateral (perpendicular to longitudinal), and transverse (neither longitudinal nor lateral).

One generic aspect of the invention relates to an automotive vehicle steering system comprising a steered wheel and an actuator for turning the steered wheel about a turning axis to steer the wheel. The actuator comprises a housing that comprises an interior enclosed by an axially extending side wall having opposite axial ends. A shaft that has a longitudinal axis coaxial with the housing side wall comprises an interior axial end disposed within the interior of the housing and an exterior axial end that is exterior to the interior of the housing. An electric motor comprises a rotor that is disposed within the interior of the housing for rotation about an axis that is coaxial with the shaft axis. The rotor comprises a cylindrical rotor tube comprising an open axial end through which the shaft coaxially passes, and which is rotatable about the coaxis of the shaft and rotor. The motor further comprises a stator for operating the rotor to rotate the rotor tube. There is an internal screw thread on the rotor tube and an external screw thread on the shaft. A set of transmission rollers operatively couples the internal screw thread and the external screw thread to provide for bi-directional motion transmission between the rotor tube and the shaft such that rotation of the rotor tube causes the shaft to move axially of the housing and axial motion of the shaft causes rotation of the rotor tube. A coupling couples the exterior axial end of the shaft to the wheel.

Another generic aspect relates to an automotive vehicle steering system comprising a steered wheel and an actuator for turning the steered wheel about a turning axis to steer the wheel. The actuator comprises a housing that comprises an interior enclosed by an axially extending side wall having opposite axial ends. A shaft that has a longitudinal axis coaxial with the housing side wall has an interior axial end disposed within the interior of the housing and an exterior axial end that is exterior to the interior of the housing. An electric motor comprises a rotor that is disposed within the interior of the housing for rotation about an axis that is coaxial with the shaft axis. The rotor comprises a cylindrical rotor tube comprising an open axial end through which the shaft coaxially passes, and which is rotatable about the coaxis of the shaft and rotor. The motor further comprises a stator for operating the rotor to rotate the rotor tube. There is an internal formation on the rotor tube, and an external formation on the shaft. A set of elements operatively couple the internal and the external formations to provide for bi-directional motion transmission between the rotor tube and the shaft such that rotation of the rotor tube causes the shaft to move axially of the housing and axial motion of the shaft causes rotation of the rotor tube. Individual elements of the set are disposed circumferentially spaced apart about the coaxis of the shaft and rotor tube with individual elements meshing with both the internal formation and the external formation and with the elements planetating about the coaxis as they transmit motion between the two formations. A coupling couples the exterior end of the shaft to the wheel.

The foregoing, and other inventive aspects, will be seen in the ensuing description and claims.

BRIEF DESCRIPTION OF THE DRAWINGS

The drawings that will now be briefly described are incorporated herein to illustrate the inventive principles via an exemplary preferred embodiment and a best mode presently contemplated for carrying out those principles.

DESCRIPTION OF THE PREFERRED EMBODIMENT(S)

Figure 1:
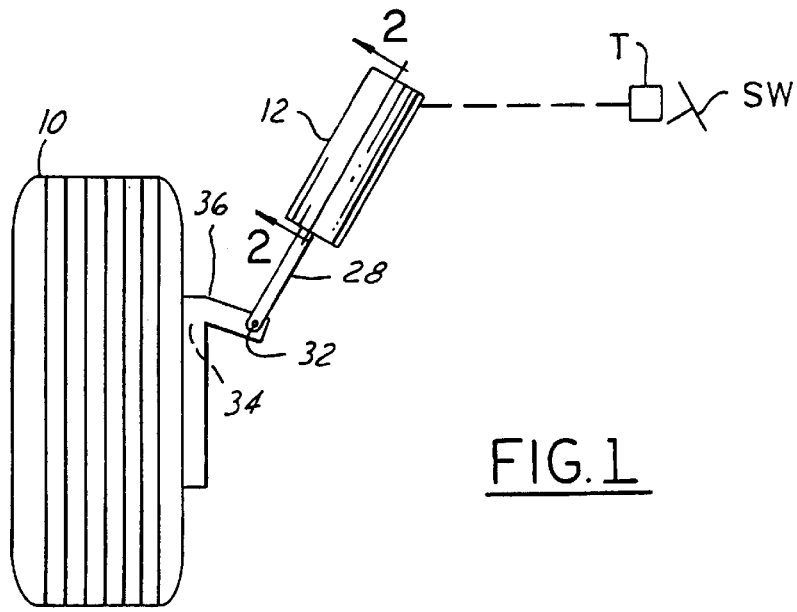
FIG. 1 is a representative plan view, somewhat schematic, of a vehicle wheel and an associated wheel steering actuator embodying principles of the invention.
Figure 2:
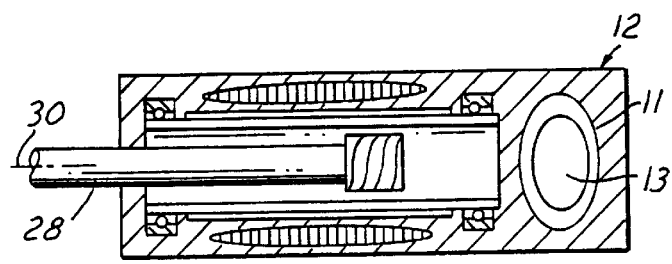
FIG. 2 is a cross section view on a slightly larger scale taken in the direction of arrows 2—2 in FIG. 1.
Figure 3:
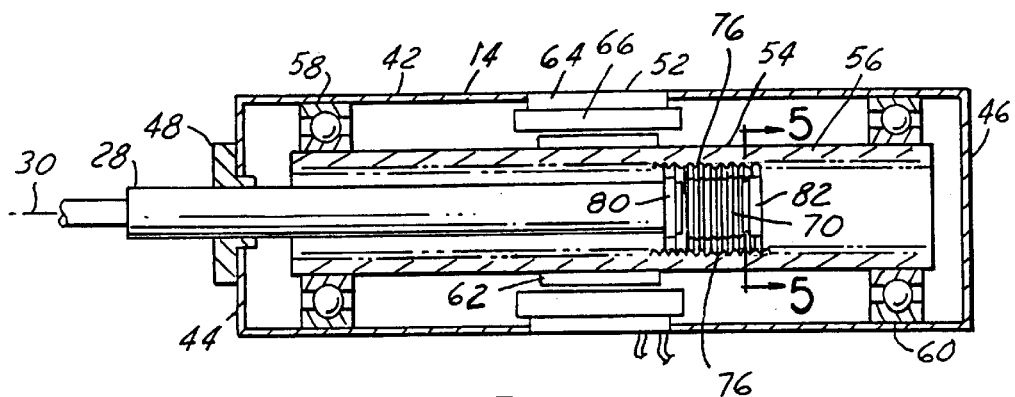
FIG. 3 is an enlarged view of FIG. 2.

FIG. 1 shows a steerable wheel 10 of an automotive vehicle and an associated actuator 12. A steering system for turning wheel 10 lacks direct mechanical coupling between wheel 10 and a steering wheel SW that is turned by the driver to steer the vehicle. Motion of the steering wheel is transmitted by wires from an electric transmitter T associated with the steering wheel to an electric controller 13 that may be contained within a module 11 of actuator 12. In response to signals from the transmitter, the controller operates actuator to steer wheel 10.

Detail of actuator 12 is shown in FIGS. 2–5. Actuator 12 comprises a cylindrical housing 14 and a shaft 28 protruding coaxially from one end of the housing along an imaginary main axis 30. A coupling 32, such as a ball joint for example, (see FIG. 1) may couple the free end of shaft 28 to wheel 10. Wheel 10 is mounted for rotation on a wheel spindle via wheel bearings (not shown). A wheel suspension and brake (also not shown) are associated with the wheel. The spindle is mounted for turning about a turning axis 34 that is generally vertical, but may be canted from true vertical for reasons related to various steering and suspension considerations that do not bear directly on the present invention. The spindle includes a steering knuckle 36 to which coupling 32 attaches. Linear motion imparted to shaft 28 along axis 30 is effective to turn the spindle, and wheel 10, about turning axis 34.

If FIG. 1 represents a right front wheel of a four wheel vehicle and actuator 12 is disposed rearward of knuckle 36, extension of shaft 28 from the position shown in FIG. 1 will push on steering knuckle 36, causing wheel 10 to turn to the right. Retraction will pull on the knuckle, causing wheel 10 to turn to the left, Housing 14 comprises an axially extending cylindrical side wall 14 that encloses an interior. At opposite axial ends, housing 14 is closed by respective end walls 44, 46, but at end wall 44, shaft 28 passes through an opening containing a seal 48 that allows shaft motion through the opening while sealing the interior of the housing from the exterior to resist intrusion of outside contaminants into the housing interior.

An electric motor 52 is housed within housing 14 and comprises a rotor 54 disposed within the housing interior for rotation about an axis that is coaxial with axis 30. Rotor 54 comprises a cylindrical rotor tube 56 which is open at least at the axial end through which shaft 28 coaxially passes. Bearing assemblies 58, 60 journal opposite end portions of rotor tube 56 on the interior of housing 14 to make the rotor tube rotatable about the coaxis 30 of shaft 28 and rotor 54. An intermediate portion of rotor tube 56 contains a motor armature comprising permanent magnets 62. Motor 52 further comprises a stator 64 for operating rotor 54 to rotate rotor tube 56. Stator 64 may comprise an electric motor winding 66 that is energized by controller 13 to create a rotating magnetic field that interacts with magnets 62 to impart torque to rotor tube 56. Suitable wiring delivers transmitter signals to controller 13 and power for operating motor 52.

Although rotor tube 56 is journaled for rotation, it is constrained against axial motion along axis 30. An internal screw thread 68, that is helical about axis 30, is disposed on the interior of rotor tube 56. The screw thread may be either cut into the wall of the rotor tube, or contained in a separate part that is assembled to the rotor tube. An external screw thread 70, that is also helical and concentric with axis 30, is disposed on shaft 28. Screw thread 70 is contained in a separate part 72 that is assembled onto shaft 28. Each screw thread 68, 70 has the same number of threads per inch (thread per centimeter in metric units); however, because they have different pitch diameters, the two threads are not precisely identical.

The basic major diameter of screw thread 70 as measured across an imaginary cylinder defined by the crest of the thread flanks is smaller than the basic major diameter of screw thread 68, similarly measured, to provide a circular annular space for accommodating a set 74 of transmission rollers 76. Transmission rollers 76 operatively couple screw thread 68 and screw thread 70 so as to provide for bi-directional transmission of motion between rotor tube 56 and shaft 28 such that rotation of rotor tube 56 causes shaft 28 to translate axially of housing 14 and axial translation of the shaft relative to the housing causes rotation of the rotor tube. While the drawings show several transmission rollers not necessarily in true positions for illustrative purposes only, it should be understood that the specific number of transmission rollers employed in any given actuator may depend on the particular design specification. In an example of one embodiment, seven transmission rollers 76 centered at equal intervals about axis 30 are present. The transmission rollers may be like those disclosed in certain embodiments of U.S. Pat. Nos. 5,491,372 and 5,557,154.

Each transmission roller 76 comprises a helical screw thread 78 which acts in a manner which is capable of transmitting motion bi-directionally between shaft 28 and rotor tube 56 as described above. Thread 78 has the same number of threads per inch, or per centimeter, as threads 68, 70. But because the basic major diameter of thread 78 is much smaller than that of either thread 68 or 70, its helix angle is noticeably greater than the helix angle of either thread 68 or 70. At any given time, a limited extent, as measured circumferentially about the respective transmission roller axis, of each of a number of convolutions of the helical thread of each respective transmission roller 76 is meshing with a limited extent, measured about axis 30, of a respective convolution of the helical screw thread 68 while a substantially diametrically opposite limited extent of each such transmission roller convolution is meshing with a limited circumferential extent of a respective convolution of helical screw thread 70. When sufficient torque is developed by motor 52 to rotate rotor tube 56, screw thread 68 of the latter acts via transmission rollers 76 to translate shaft 28. If sufficient force is applied to shaft 28 along axis 30, such as when wheel 10 is recovering from a right or left turn, screw thread 70 acts via transmission rollers 76 to rotate rotor tube 56. It is believed that the difference between the helix angle of the thread of transmission rollers 76 and that of screw thread 68 on the one hand and the difference between the helix angle of the thread of transmission rollers 76 and that of screw thread 70 on the other hand provide interfaces that endow the actuator with its bi-directional motion transmission capabilities.

Transmission rollers 76 are maintained in set 74 by journaling their ends in holes in support rings 80, 82 that fit over and are affixed to shaft 28 at opposite ends of the transmission rollers. Opposite end convolutions of each transmission roller's screw thread 78 are machined to create short axial grooves 83 that are mutually parallel and equally spaced about the transmission roller axis to form what is equivalent to integral pinions 84 at opposite ends of each transmission roller. The pinion 84 proximate support ring 80 meshes with a pinion 86 provided around the perimeter of shaft 28 proximate one end of screw thread 70, and the pinion 84 proximate support ring 82 meshes with a pinion 86 provided around the perimeter of shaft 28 proximate the opposite end of screw thread 70. The interaction between the transmission roller pinions 84 and pinions 86 is believed to impart a beneficial turning of each transmission roller as the actuator operates, thereby planetating the transmission rollers. Such turning is believed to impart a rolling interaction between each flank of the transmission roller screw thread and a respective flank of each of screw threads 68 and 70 with which it is interacting. This rolling interaction is believed helpful in eliminating, or at least minimizing, skidding between the transmission roller screw thread flanks and the flanks of screw threads 68 and 70.

Figure 4:
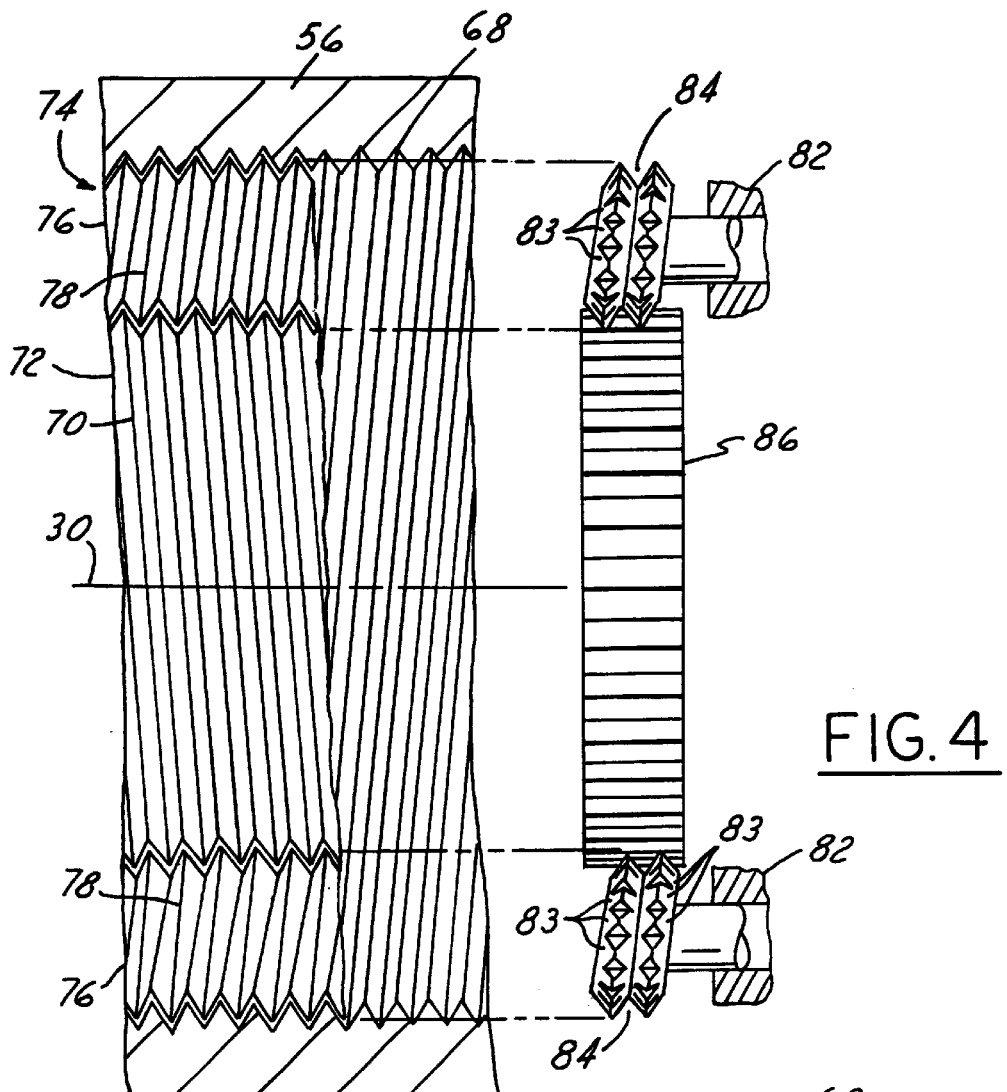
FIG. 4 is an enlarged view of a portion of FIG. 3.
Figure 5:
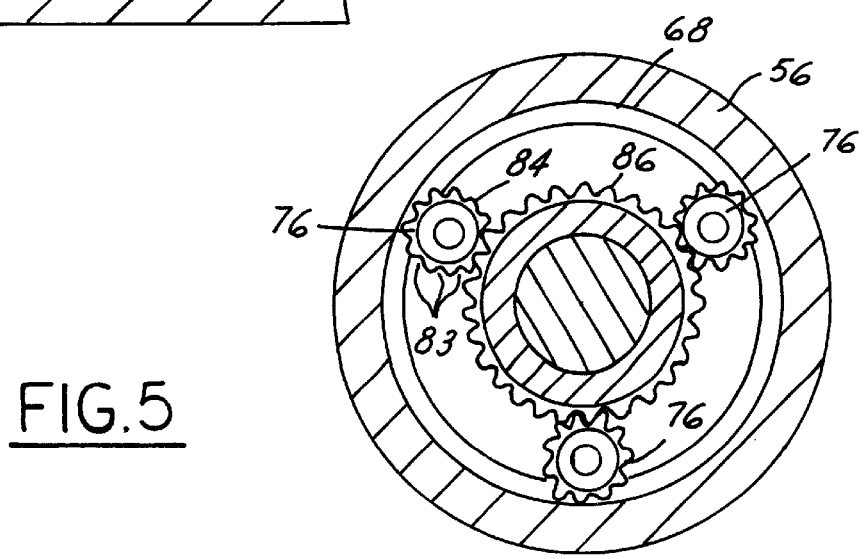
FIG. 5 is an enlarged transverse cross section view in the direction of arrows 5—5 in FIG. 3.

Because of illustrative considerations, FIG. 4 contains some apparent distortion of the screw threads. It shows each transmission roller screw thread to comprise a single continuous helix, but each screw thread 68, 70 may appear to be other than a single continuous helix. It should be understood that each screw thread 68, 70 of the disclosed preferred embodiment is in fact a single continuous helix, and furthermore that the helix of each screw thread 68, 70 advances in the same direction. The helices of screw threads 68 and 70 are phased such that an imaginary line that is radial to axis 30 and intersects the root of screw thread 68 will intersect the crest of screw thread 70. For any of screw threads 68, 70, and 78, a fragmentary cross section through a convolution of the thread that is perpendicular to the respective helix will show that the thread flanks are substantially symmetrical about the root of the thread. The crests and roots may also be somewhat rounded.

Figures 6, 7:
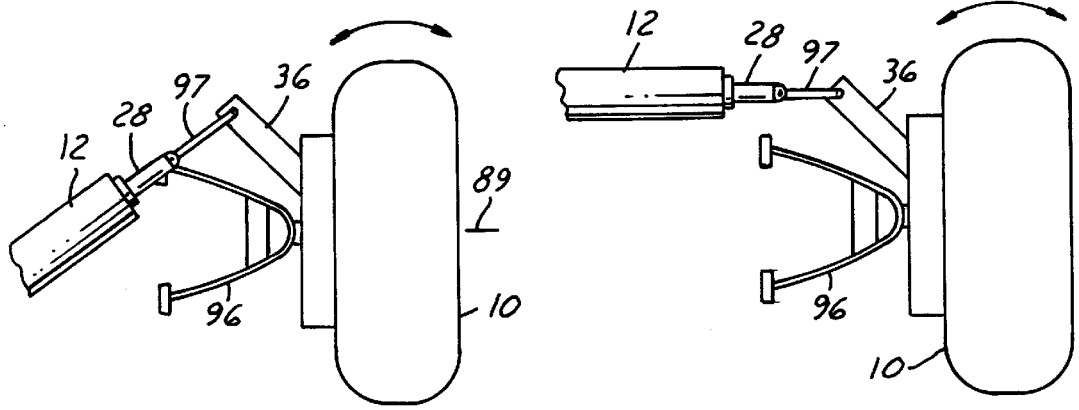
FIG. 6 is a top plan view of one possible orientation for a steering actuator.
FIG. 7 is a top plan view of another possible orientation for a steering actuator.

FIG. 6 shows a transverse orientation for actuator 12 for a right front wheel 10. The steering knuckle 36 is forward of the spindle axis 89 about which wheel 10 revolves. When shaft 28 extends from housing 14, it acts through a tie rod 97 to push knuckle 36 to turn wheel 10 to the right about turning axis 34, and when it retracts, it pulls the knuckle, turning the wheel to the left. The Figure also shows a suspension control arm 96 of a suspension system that suspends the spindle and wheel from the vehicle chassis. The end of housing 14 opposite shaft 28 is fastened to the chassis by any suitable means that allows the actuator to follow motion of the wheel and spindle that is allowed by the suspension system without changing the direction in which the wheel is being steered by the actuator.

Figures 8, 9:
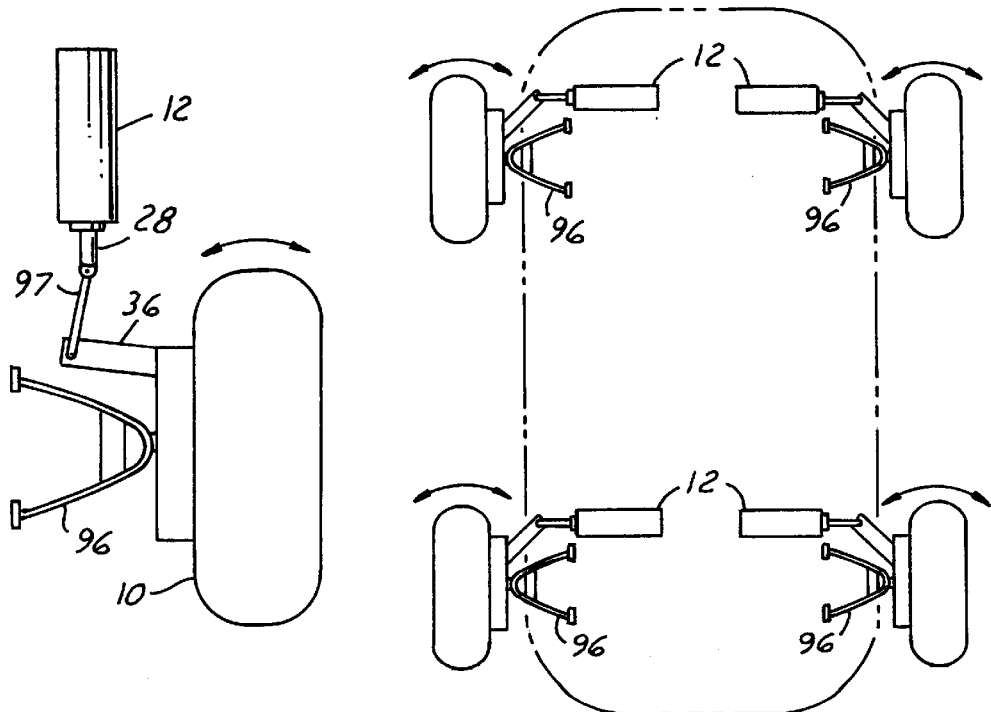
FIG. 8 is a top plan view of still another possible orientation for a steering actuator.
FIG. 9 is a top plan view of an all wheel steering system in a four wheel vehicle.

FIG. 7 illustrates a lateral orientation for actuator 12, and FIG. 8, a longitudinal orientation. FIG. 9 illustrates a four wheel steering arrangement in which each wheel has its own devoted actuator and all actuators have lateral orientations. It should be appreciated that in any particular vehicle any particular actuator may have an orientation like, or different from, the orientation of other actuators.

While a presently preferred embodiment has been illustrated and described, it is to be appreciated that the invention may be practiced in various forms within the scope of the following claims.

What is claimed is:

1. An automotive vehicle steering system comprising:
   a steered wheel;
   and an actuator for turning the steered wheel about a turning axis to steer the wheel;
   the actuator comprising a housing that comprises an interior enclosed by an axially extending side wall having opposite axial ends;
   a shaft that has a longitudinal axis coaxial with the housing side wall, an interior axial end disposed within the interior of the housing and an exterior axial end that is exterior to the interior of the housing;
   an electric motor comprising a rotor that is disposed within the interior of the housing for rotation about an axis that is coaxial with the shaft axis, the rotor comprising a cylindrical rotor tube comprising an open axial end through which the shaft coaxially passes, and which is rotatable about the coaxis of the shaft and rotor, the motor further comprising a stator for operating the rotor to rotate the rotor tube;
   an internal screw thread on the rotor tube;
   an external screw thread on the shaft;
   a set of transmission rollers operatively coupling the internal screw thread and the external screw thread to provide for bi-directional transmission of motion between the rotor tube and the shaft such that rotation of the rotor tube causes the shaft to move axially of the housing and axial motion of the shaft causes rotation of the rotor tube; and
   a coupling that couples the exterior axial end of the shaft to the wheel;
   wherein the transmission rollers comprise identical screw threads meshing with the internal and external screw threads, and in which the internal, external, and transmission roller screw threads all have the same number of threads per unit of axial length.

2. An automotive vehicle steering system as set forth in claim 1 including support rings disposed on the shaft at opposite ends of the transmission rollers for locating the transmission rollers spaced circumferentially apart about the coaxis and journaling the transmission rollers, and in which the transmission rollers include gear teeth meshed with pinions on the shaft to cause the transmission rollers to turn about their own axes as they transmit motion between the internal and external screw threads.

3. An automotive vehicle steering system as set forth in claim 1 including a steering wheel that is turned to steer the wheel via a transmitter that delivers electric signals to an electric controller that operates the electric motor to cause the shaft to translate in correlation with turning of the steering wheel to thereby steer the wheel.

4. An automotive vehicle steering system comprising:
   a steered wheel;
   and an actuator for turning the steered wheel about a turning axis to steer the wheel;
   the actuator comprising a housing that comprises an interior enclosed by an axially extending side wall having opposite axial ends;

a shaft that has a longitudinal axis coaxial with the housing side wall, an interior axial end disposed within the interior of the housing and an exterior axial end that is exterior to the interior of the housing;

an electric motor comprising a rotor that is disposed within the interior of the housing for rotation about an axis that is coaxial with the shaft axis, the rotor comprising a cylindrical rotor tube comprising an open axial end through which the shaft coaxially passes, and which is rotatable about the coaxis of the shaft and rotor, the motor further comprising a stator for operating the rotor to rotate the rotor tube;

an internal formation on the rotor tube;

an external formation on the shaft;

a set of elements operatively coupling the internal formation and the external formation to provide for bi-directional transmission of motion between the rotor tube and the shaft such that rotation of the rotor tube causes the shaft to move axially of the housing and axial motion of the shaft causes rotation of the rotor tube;

individual elements of the set being disposed circumferentially spaced apart about the coaxis of the shaft and rotor tube with the elements meshing with both the internal formation and the external formation and with the elements planetating about the coaxis as they transmit motion between the two formations; and a coupling that couples the exterior end of the shaft to the wheel;

wherein the elements comprise transmission rollers, the internal formation comprises a helical internal screw thread, the external formation comprises a helical external screw thread, and the transmission rollers comprise respective screw threads, and the helical internal screw thread, the helical external screw thread, and the transmission roller screw threads all have the same number of threads per unit of axial length.

5. An automotive vehicle steering system as set forth in claim 4 including support rings disposed on the shaft at opposite ends of the transmission rollers for locating the transmission rollers spaced circumferentially apart about the coaxis and journaling the transmission rollers, and in which the transmission rollers include pinions meshed with a pinion on the shaft to cause the transmission rollers to planetate.

6. An automotive vehicle steering system as set forth in claim 4 including a steering wheel that is turned to steer the wheels via a transmitter that delivers electric signals to an electric controller that operates the electric motor to cause the shaft to translate in correlation with turning of the steering wheel to thereby steer the vehicle.

* * * * *